W. BARTHOLOMEW.
SAFETY MECHANISM FOR MANGLES.
APPLICATION FILED JUNE 17, 1912.
1,148,739.
Patented Aug. 3, 1915.
5 SHEETS—SHEET 1.
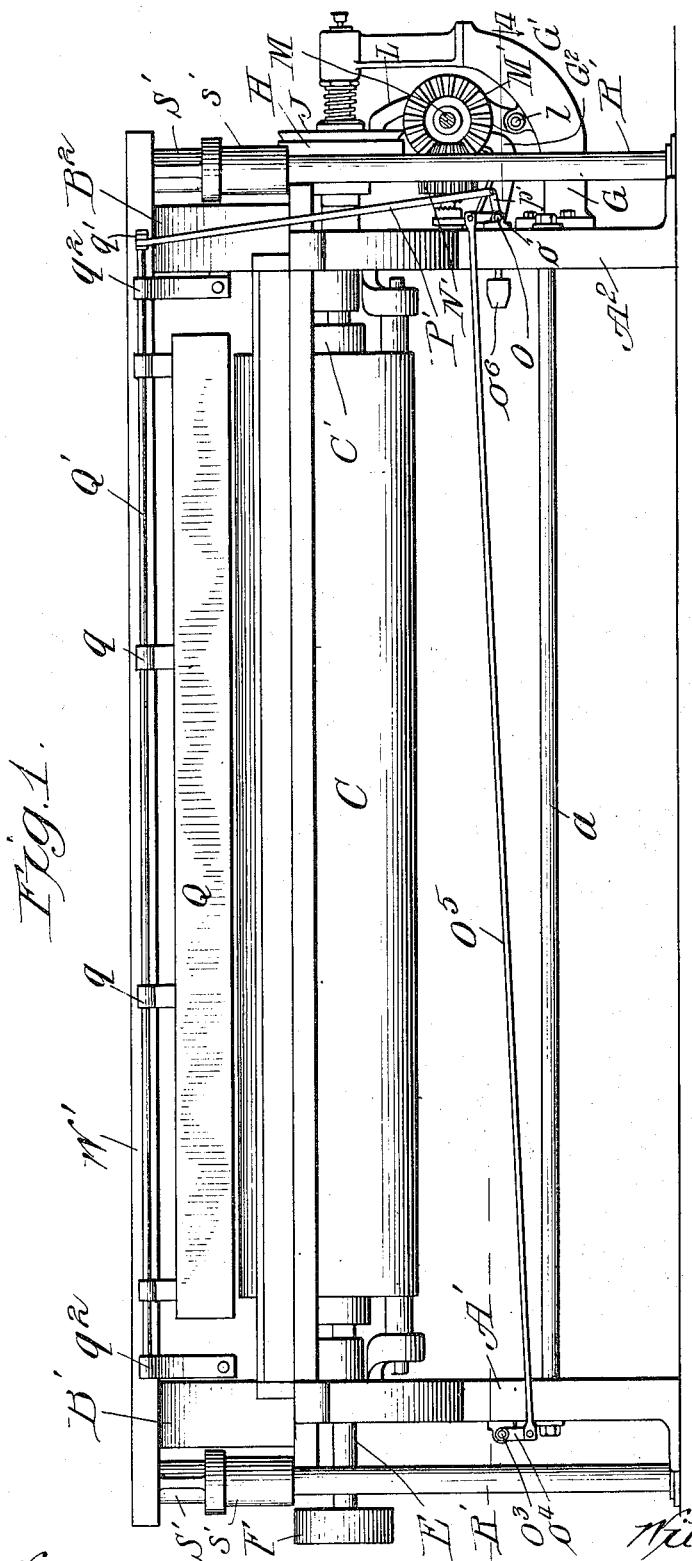
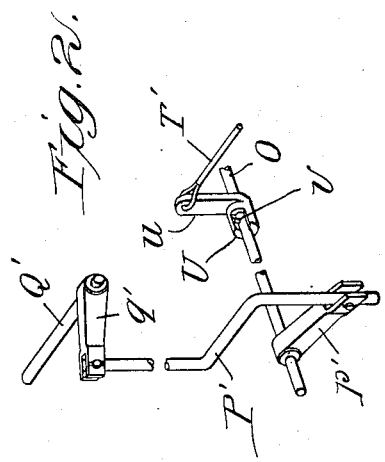
Inventor:
William Bartholomew

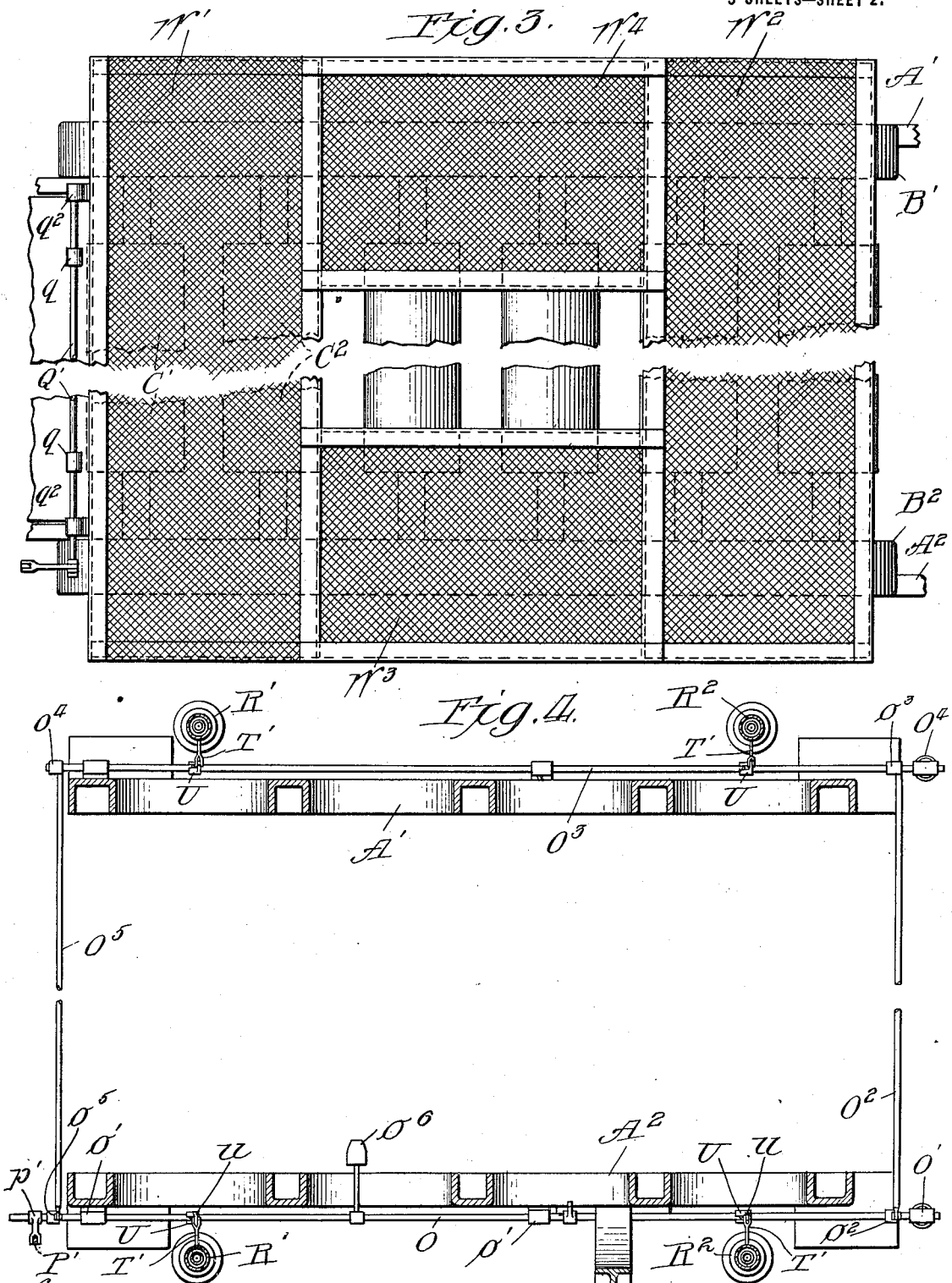

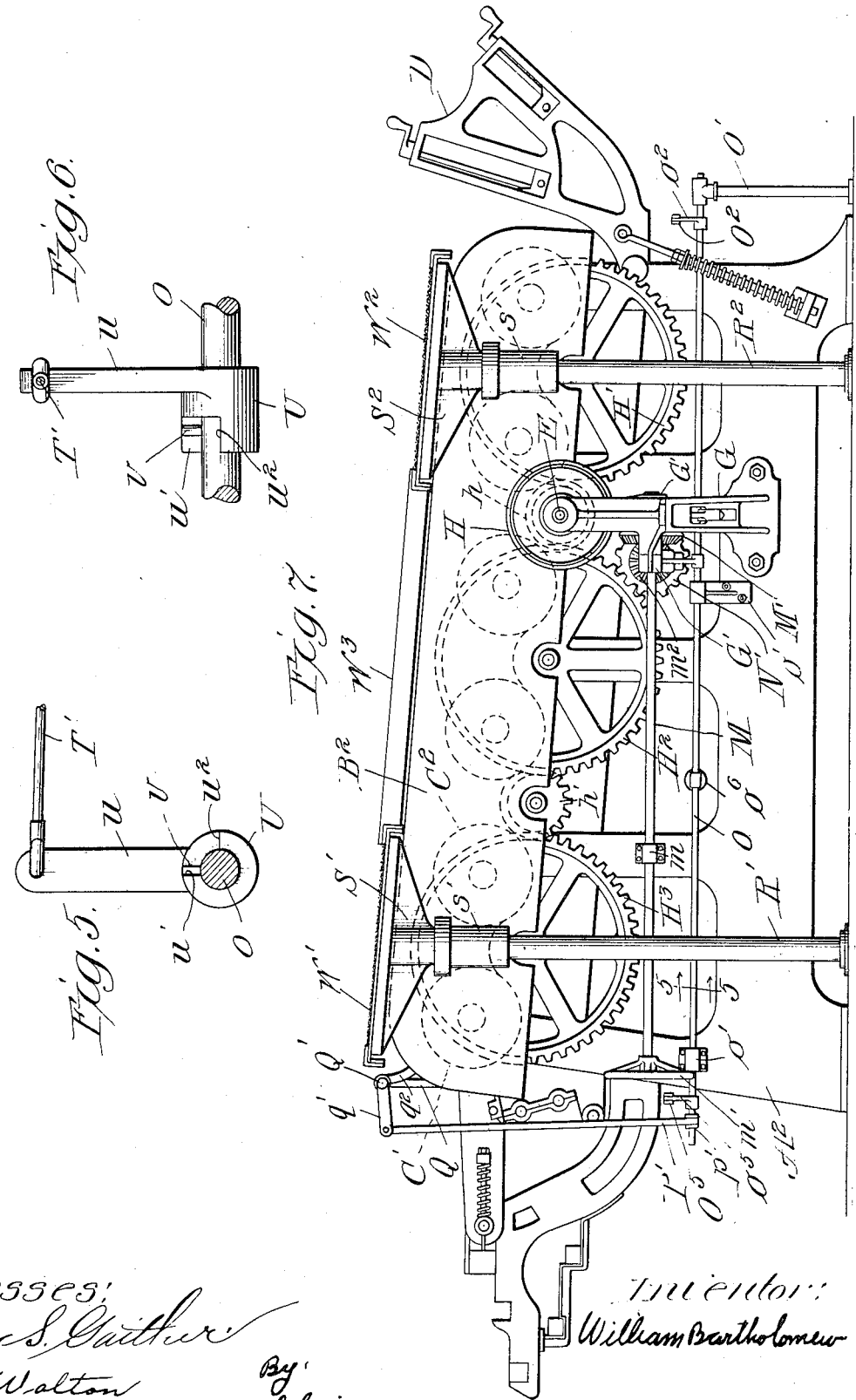

W. BARTHOLOMEW.
SAFETY MECHANISM FOR MANGLES.
APPLICATION FILED JUNE 17, 1912.
1,148,739.
Patented Aug. 3, 1915.
5 SHEETS—SHEET 4.
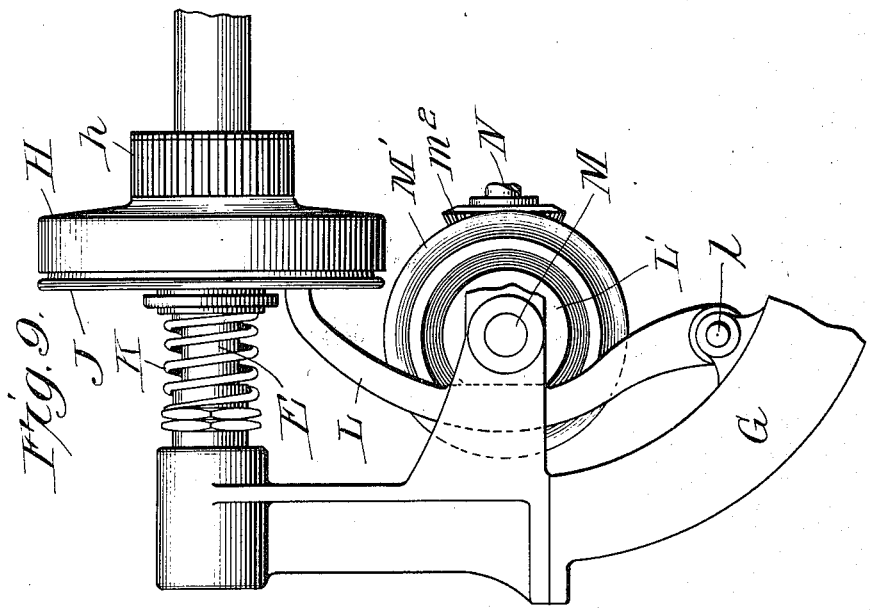
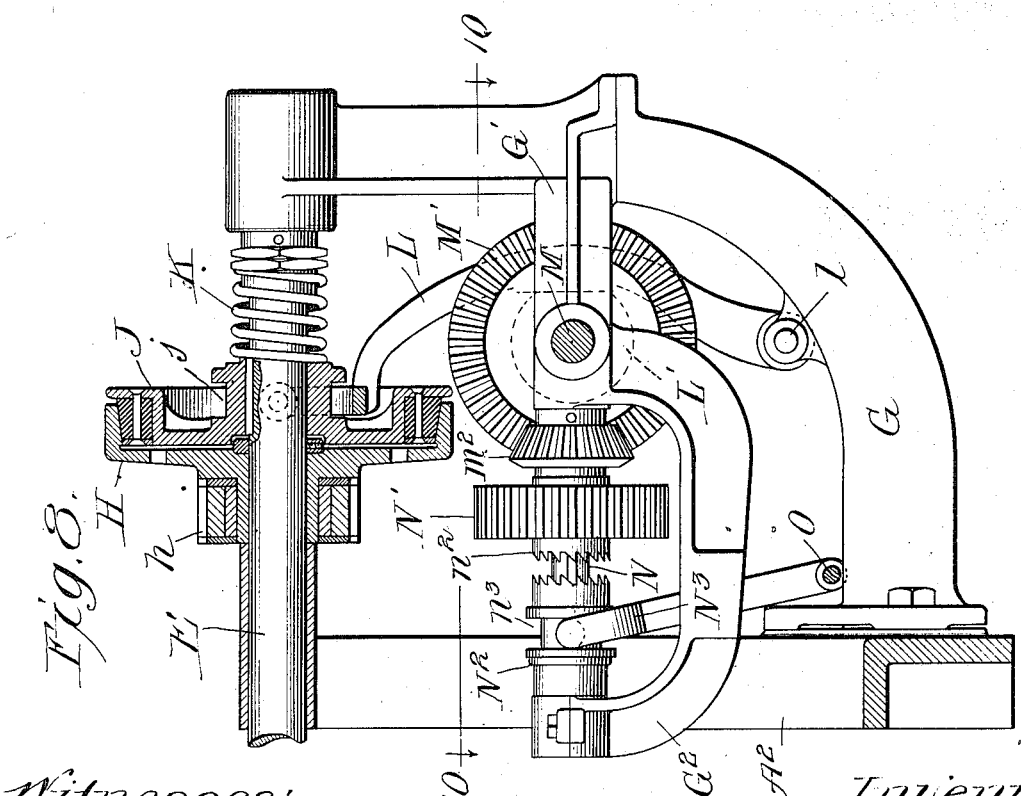

W. BARTHOLOMEW.
SAFETY MECHANISM FOR MANGLES.
APPLICATION FILED JUNE 17, 1912.
1,148,739.
Patented Aug. 3, 1915.
5 SHEETS—SHEET 5.
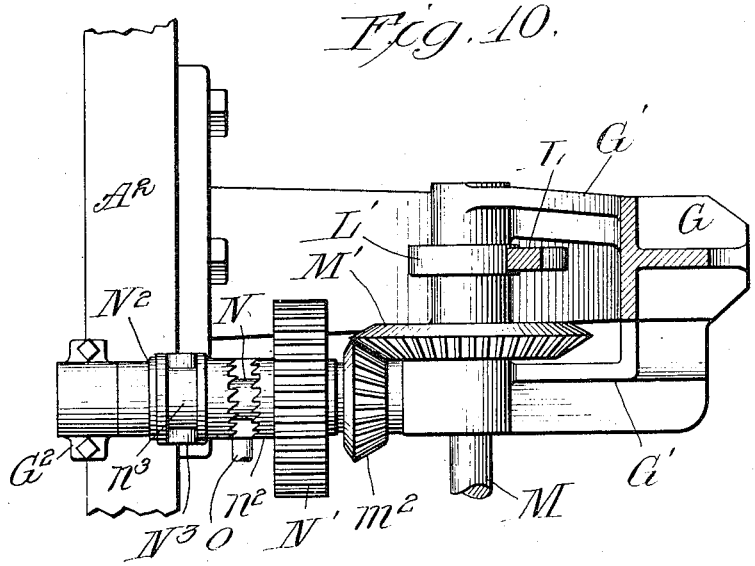
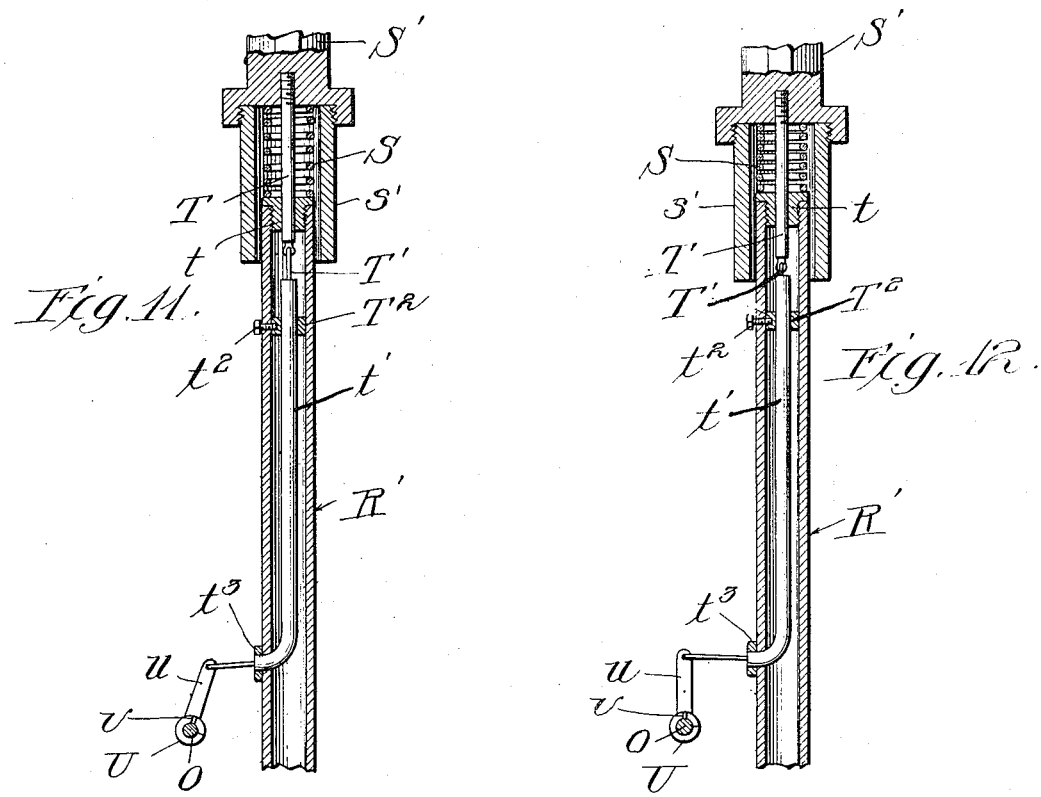
Witnesses:
Harry S. Gaither
A. L. Walton
Inventor:
William Bartholomew
by Sheridan, Wilkinson, Scott & Richmond
Attys

UNITED STATES PATENT OFFICE.

WILLIAM BARTHOLOMEW, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

SAFETY MECHANISM FOR MANGLES.

1,148,739.  Specification of Letters Patent.  Patented Aug. 3, 1915.

Application filed June 17, 1912. Serial No. 704,075.

*To all whom it may concern:*

Be it known that I, WILLIAM BARTHOLOMEW, a citizen of the United States, residing at Chicago, in the county of Cook and State of Illinois, have invented certain new and useful Improvements in Safety Mechanism for Mangles, of which the following is a specification.

My invention relates in general to ironing machines, and more particularly to safety devices for mangles.

In the use of mangles, the operators are some times injured through carelessness in feeding the articles to the rolls and occasionally in attempting, while the machine is in operation, to disengage articles which have become caught in passing through the machine.

The primary object of my present invention is to provide a mangle, or similar machine, with safety appliances, which will prevent access to the rolls when the machine is in operation.

A further object of my invention is to provide a mangle, or similar machine, with removable guards which prevent access to the rolls when the machine is in operation, and which when lifted to permit access to the rolls will instantly automatically stop the operation of the machine.

A still further object of my invention is to provide a mangle, or similar machine, with convenient and efficient means for safeguarding the operators, which will not interfere with the normal operation of the machine, but will instantly stop the operation when the moving parts are exposed and danger of injury to the operators consequently exist.

My invention will be more fully disclosed hereinafter with reference to the accompanying drawings, in which the same is illustrated as embodied in a convenient and practical form, and in which—

Figure 1 is a front elevational view of a mangle equipped with my present invention; Fig. 2 a detail perspective view of a portion of the rock shaft which actuates the cutout clutch; Fig. 3, a plan view of the top of the mangle, showing the relation of the guard to the underlying rolls; Fig. 4, a sectional view on line 4 4, Fig. 1, parts being omitted to better show the mechanism controlled by the guard for automatically stopping the machine; Fig. 5, an enlarged detail section on line 5 5, Fig. 7; Fig. 6, an elevational view of the detail shown in Fig. 5; Fig. 7, a side elevational view, looking from the right in Fig. 1; Fig. 8, an enlarged elevational view of the clutch mechanism, parts being shown in section; Fig. 9, an elevational view of the clutch viewed from the opposite side to that shown in Fig. 8; Fig. 10, a plan view of the clutch controlling mechanism taken on line 10 10, Fig. 8; Fig. 11, an enlarged vertical section of the central portion of one of the guard supporting posts, the parts being shown in the positions they assume when the post is relieved of the weight of the guard; and Fig. 12, a view similar to Fig. 11, showing the position of the parts when the post supports the guard.

The same reference characters are used to designate the same parts in the several figures of the drawings.

Reference characters A' and A² designate the side supporting frames of the mangle between which are supported the rolls, aprons, steam chests, and coöperating parts. The side frames are provided with feet secured to a floor, and are rigidly secured together by transverse connecting means, such, for instance, as the rod *a* shown in Fig. 1.

B' and B² designate housings supported upon the side frames A' and A² within which the trains of gears for driving the rolls are inclosed.

C designates one of the aprons, while C', C², etc., designate the series of rolls.

D designates the mechanism for adjusting the positions of the rolls and aprons relatively to the steam chests.

E indicates a power shaft extending transversely through the machine and provided with a suitable power transmitting device, such as a pulley F, by which it is driven. The portion of the shaft which projects to the opposite side of the mangle from the pulley F is supported by a bracket G projecting outwardly and upwardly from the side supporting frame A'.

H designates one member of a driving clutch having rigidly secured thereto a gear $h$ loosely mounted upon the power shaft E. The gear $h$ is intermediate of and meshes with the adjacent larger gear wheels H' and $H^2$.

$h'$ designates a small gear intermediate of and meshing with the large gears $H^2$ and $H^3$, such meshed gears constituting a train through which power is communicated from the power shaft to the several rolls.

J designates the other member of the clutch which is splined upon the shaft E and normally forced into engagement with the coöperating clutch member H by the spring K, thereby non-rotatively locking the gear $h$ to the power shaft.

The mangle above generally described does not in itself constitute my present invention, but is merely illustrated and described in order that the construction and operation of my improved safety mechanism may be fully disclosed. It will, however, be obvious from the subsequent description that my present invention is not limited in its application to a mangle of the construction above described, but is also applicable to other forms of mangles and to analogous machines.

L designates a lever pivotally mounted at its lower end upon the bracket G, as indicated at $l$. The upper end of the lever L is bifurcated and engages within a groove $j$ formed in the hub of the clutch member J. Extending longitudinally at one side of the machine is a shaft M journaled upon the side frame $A^2$ intermediate of its ends in a suitable bracket $m$. The forward end of the shaft M is provided with a hand wheel $m'$, while the rear end of the said shaft extends through a pair of spaced brackets G' projecting inwardly from the main bracket G.

Fixed upon the portion of the shaft M intermediate of the brackets G' is a bevel gear wheel M' which meshes with a smaller bevel gear $m^2$ fixed upon a countershaft N, the latter being supported at its ends in brackets $G^2$ supported by the main bracket G.

Fixed upon the portion of the shaft M between the brackets G' is a cam L' adapted to engage the adjacent portion of the lever L and to thereby oscillate such lever and move the clutch member J out of engagement with the clutch member H.

N designates a gear wheel loosely mounted upon the countershaft N and meshing with a larger gear $H^2$, as shown in Fig. 7. $N^2$ designates a clutch member non-rotatively, but axially, movable on the countershaft N adapted to engage a coöperating clutch member $n^2$ fixed to the gear wheel N'.

$N^3$ designates a crank lever, the upper end of which is bifurcated and engages within an annular groove $n^3$ in the clutch member $N^2$. The lower end of the crank lever $N^3$ is fixed to a rock shaft O extending longitudinally of the machine and journaled in suitable brackets $o'$ fixed to the side frame $A^2$. The forward end of the rock shaft O is provided with a crank arm $p'$ which is pivotally connected by a rod P' with the crank arm $q'$ projecting outwardly from a transverse rock shaft Q', the latter being journaled in a horizontal position at the feed end of the mangle by means of suitable brackets $q^2$, $q^2$. Depending from the rock shaft Q' and rigidly secured thereto by suitable brackets $q$ is a safety-board Q located in position to be engaged by the hands of the operator who feeds the articles to the machine should his hands approach dangerously near to the adjacent roll.

The rear end of the rock shaft O is supported by a standard O' and adjacent such standard is provided with an upwardly projecting crank arm $o^2$ to which is pivotally connected a rod $O^2$ extending transversely across the machine and pivotally connected at the opposite side of the machine to a crank arm $o^3$ depending from a rock shaft $O^3$, the latter being journaled in suitable brackets upon the side supporting frame A' and projecting to the front, or feeding end of the machine. The rear end of the rock shaft $O^3$ is supported in the upper end of a standard $O^4$ similar to the standard O'. A crank arm $o^4$ projects downwardly from the forward end of the rock shaft $O^3$ and is pivotally connected by a rock shaft $O^5$ with a crank arm $o^5$ projecting from the forward end of the rock shaft O.

At each side of the machine adjacent the front and rear ends of the respective side supporting frames A' and $A^2$ are standards or posts R' and $R^2$.

Telescopically supported upon the upper ends of the standards R' and $R^2$ are heads S' and $S^2$, each of such heads being provided with a depending sleeve $s'$ which loosely surrounds the upper end of the adjacent corresponding standard.

A spring S is located within the sleeve $s$ and is interposed between the head S' and the cap $t$ secured to the upper end of the corresponding standard.

A rod T is secured at its upper end to the head S' and depends through the spring S and thence through the cap $t$ to the interior of the standard. The lower end of the rod T is secured to a wire, chain, or other flexible connection T' which extends centrally within the standard and out through an opening in the same at a point slightly above the rock shaft O where it is connected to the upper end of a crank arm $u$ mounted upon the rock shaft O. The flexible connector T' is guided within a tube $t'$ secured within the standard in any suitable manner, as by means of a surrounding collar $T^2$ which is secured within the standard by the clamp screw $t^2$. The guide tube $t'$ extends through the wall of the standard around the flexible connector and is secured in such position by a collar $t^3$.

The hub U of the crank arm $u$ is provided with a notch through which extends a radial pin $v$ fixed to the rock shaft O. The cutaway portion of the hub U forms shoulders $u'$ and $u^2$, the former of which is adapted to engage the pin $v$ and thereby rock the shaft O when the crank arm $u$ is oscillated toward the adjacent standard R'.

As shown in Fig. 4, each of the four standards arranged in pairs R', $R^2$ on opposite sides of the machine, is constructed as above described, as shown in Figs. 10 and 11, and is connected to a crank arm $u$, as above described. The crank arms $u$ adjacent the pair of standards on the right of the machine, as viewed in Fig. 1, are adapted to directly oscillate the rock shaft O, while the crank arms $u$ adjacent the standards on the left side of the machine are adapted to directly oscillate the rock shaft $O^3$ and, through the crank arms $o^3$ and $o^4$ thereon, and the connecting rods $O^2$ and $O^5$, and crank arms $o^2$ and $o^5$, to oscillate the rock shaft O.

Resting upon the heads on the four standards is a guard of suitable construction which overlies the machine and prevents access to the revolving rolls. The guard may be conveniently formed in four sections, two of which W' and $W^2$ extend transversely across the front and rear of the machine, the former being supported at its ends upon the heads S', S' of the front standards R', R', and the latter section $W^2$ being directly supported upon the heads $S^2$, $S^2$ of the rear standards.

$W^3$, $W^4$ indicate longitudinal sections of the guard which are supported intermediate of and upon the inner edges of the transverse sections of the guard. Each section of the guard may be conveniently formed of a rectangular frame, comprising parallel angle irons having vertical flanges depending in the case of the sections W', $W^2$ so as to fit around the heads S', $S^2$ on the standards, as shown in Fig. 7. The longitudinal sections $W^3$ and $W^4$ of the guard are secured to the transverse sections in any suitable manner. The sections of the guard extend inwardly a sufficient distance to prevent the operator of the machine from reaching the rolls underlying the guard, thereby rendering it necessary to remove the guard before the operator can have access to the rolls. Hence when any articles are caught in passing through the mangle, the operators must first lift the guard before they can reach into the rolls to disengage the caught articles.

The operation of my improved safety mechanism is as follows: When the guard is in position upon the heads of the four supporting standards, its weight is sufficient to compress the several springs S, as shown in Fig. 12. The several crank arms $u$ consequently occupy vertical positions with their shoulders $u'$ engaging with the corresponding pins $v$ on the rock shafts O and $O^3$. At this time the position of the rock shaft is such that the clutch member $N^2$ is in the position shown in Fig. 8, in which it is disengaged from the clutch member $n^2$ on the gear wheel N'. The rock shaft O is normally retained in such position by a counterbalance $o^6$. Power is applied to the shaft E and is communicated through the engaged conical clutch members H and J to the gear $h$, and thence to the adjacent larger gears H', $H^2$ with which it meshes. The larger gears H', $H^2$ are in mesh with other gears of the train for communicating rotary motion from the shaft E to the several rolls. The cam L' is in position for its flat face to lie opposite the flat surface of the lever L. Consequently the said lever is in a position to permit the spring K to retain the conical clutch member J in frictional engagement with the coöperating clutch member H. The gear wheel N' on the countershaft N rotates idly through engagement with the larger gears $H^2$, but does not rotate the countershaft N upon which it is normally loosely mounted. Should an article become caught during its passage through the rolls, or should it become desirable for any other reason for the operator to have access to the rolls, and it consequently become necessary to remove the guard, any lifting of the guard will relieve the weight of the nearest standard head to the point where the lifting pressure is applied, thereby permitting the spring S to expand and lift the corresponding head so as to exert an upward pull on the flexible connector T', which in turn oscillates the crank arm $u$ to which it is connected, and the latter, through the engagement of the shoulder $u'$ thereon with the pin $v$ on the rock shaft O or $O^3$, causes the rock shaft to be rocked a sufficient distance for the crank lever $N^3$ to move the clutch member $N^2$ into engagement with the coöperating clutch member $n^2$ fixed to the gear wheel N'. As the gear wheel N' constantly rotates during the operation of the machine, it will impart rotary motion to the clutch member $N^2$, and thence to the countershaft N upon which the clutch member is splined. The rotation of the countershaft N rotates the bevel gear $m^2$ fixed thereon, which in turn rotates the larger gear $m'$ fixed upon the shaft M. The consequent rotation of the shaft M rotates the cam L', thereby oscillating the lever L against the tension of the spring K and moving the clutch member J out of engagement with the coöperating clutch member H. The power shaft E is thereby disconnected from the gear $h$ so that the transmission of driving power to the machine is interrupted. As the gear wheel N' rotates quite rapidly, and as a very slight movement of the cam L' is sufficient to oscillate the lever L and disengage the driving clutch members, it is obvious that instantly upon the shaft O being rocked so as to engage the clutch members on the countershaft N, the power will be disconnected from the machine and its operation will cease. When the left side of the guard, as viewed from the front or feeding end of the machine, is lifted, the rock shaft $O^3$ is oscillated, which, through the crank arms $o^3$ and $o^4$ and connecting rods $O^2$ and $O^5$, and crank arms $o^2$ and $o^5$, oscillates the rock shaft O and operates the clutch on the countershaft so as to produce an instant cessation of the operation of the machine in the same manner as if the guard at the right of the machine were lifted. If the front or rear of the guard were lifted the same action would take place, as immediately upon the relieving of any of the springs S of the weight of the overlying portion of the guard it will expand and effect the operation of the stopping mechanism. After the machine has been automatically stopped in the manner described, it will remain inoperative until the shaft M is rotated manually by applying pressure to the hand wheel $m'$ thereon, a sufficient distance to rotate the cam L' relatively to the lever L to the position shown in Fig. 9, in which the flat surface of the cam engages the adjacent portion of the lever L, thereby permitting the spring K to force the clutch member J into operative engagement with the clutch member H. By means of the safety-board Q the machine is instantly stopped should the hand of the operator who is feeding the articles to the machine approach dangerously near the adjacent feed roll. The hand of the operator in such instance oscillates inwardly the safety-board, thereby rocking the shaft Q' and swinging downwardly the crank arm $q'$ thereon, which, through the connecting rod P' and crank arm $p'$ on the shaft O, oscillates the latter so as to effect the engagement of the clutch on the countershaft and the consequent stopping of the machine. This safety feature, however, does not in itself constitute my present invention, as it forms the subject-matter of a copending application. It will be observed by reference to Fig. 2 in particular, that the rock shaft O may be oscillated by the safety-board without any interference from the several crank arms $u$, inasmuch as the oscillation of the rock shaft O by the safety-board merely moves the several pins $v$ away from the shoulders $u'$ on the several crank arms $u$.

From the foregoing description, it will be observed that I have invented an improved safety mechanism for mangles, and similar machines, which will effect the instant stopping of the machine when its further operation would expose the operators to possible injury. It will be further observed that my invention prevents access being had to the moving parts while they are in motion, by reason of the automatic stopping of the machine when the guard is lifted by the operators in an endeavor to obtain access to the moving parts of the machine.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. The combination with a machine of the character described comprising revolving rolls, of a movable guard normally preventing access to the rolls, and means controlled by the weight of said guard for automatically discontinuing the rotation of said rolls when said guard is displaced.

2. The combination with a machine of the character described comprising revolving rolls, of means for driving said rolls, a removable guard normally preventing access to the rolls, and means actuated by the driving means for discontinuing the rotation of said rolls when said guard is displaced from its normal position.

3. The combination with a machine of the character described comprising revolving rolls, of a guard normally overlying said rolls and bodily removable to permit access to the rolls, and means controlled by the weight of said guard for preventing the rotation of said rolls when said guard is displaced from its normal position.

4. The combination with a machine of the character described comprising revolving rolls, of a movable guard comprising angularly disposed sections normally preventing access to the rolls by overlying the same, and means automatically discontinuing the rotation of said rolls when any portion of said guard is displaced.

5. The combination with a machine of the character described comprising revolving rolls, of a removable guard comprising side and end portions overlying the rolls, and a plurality of devices controlled by different portions of said guard for discontinuing the rotation of said rolls when the corresponding portions of the guard are displaced.

6. The combination with a machine of the character described comprising revolving rolls, of a guard normally preventing access to the rolls, a driving element, a clutch operatively connecting said driving element with the rolls, a guard normally preventing access to the rolls, and means actuated by the driving element for automatically actuating said clutch to disconnect the driving element from said rolls when said guard is displaced from its normal position.

7. The combination with a machine of the character described comprising moving parts, of a bodily removable guard overlying said moving parts, and a plurality of devices controlled by different portions of said guard for discontinuing the operation of the moving parts of the machine when the corresponding portions of the guard are displaced.

8. The combination with a machine of the character described comprising moving parts, of a guard comprising separately removable sections normally preventing access to the moving parts, a driving element, a clutch controlling the connection of the driving element with the moving parts, and a plurality of devices controlled by different portions of said guard for actuating said clutch to disconnect the driving element from said moving parts of the machine when any portion of said guard is displaced.

9. The combination with a machine of the character described comprising moving parts, of a guard normally preventing access to the moving parts, a driving element, a clutch controlling the connection of the driving element with the moving parts, a plurality of devices controlled by different portions of said guard for actuating said clutch to disconnect the driving element from said moving parts of the machine when any portion of said guard is displaced, and means controlled by the weight of said guard when in normal position for retaining said clutch actuating devices inactive.

10. The combination with a machine of the character described comprising revolving rolls, of a removable guard comprising side and end portions overlying the rolls, and a plurality of devices upon which said guard is supported for discontinuing the rotation of said rolls when any portion of said guard is displaced.

11. The combination with a machine of the character described comprising moving parts, of a guard for preventing access to said moving parts, a plurality of standards upon which said guard is removably supported, driving means for operating the moving parts of the machine, and mechanism for disconnecting the driving means from the moving parts of the machine, said mechanism being rendered inactive by said guard when supported upon said standards.

12. The combination with a machine of the character described comprising moving parts, of a guard for preventing access to said moving parts, a plurality of standards upon which said guard is removably supported, driving means for operating the moving parts of the machine, mechanism for disconnecting the driving means from the moving parts of the machine, a rock shaft controlling the operation of said mechanism, and a spring operatively connected to said shaft to oscillate the same to effect the disconnection of the driving means from the moving parts of the machine, said spring being rendered inactive by said guard when supported upon said standards.

13. The combination with a machine of the class described, comprising moving parts, of a guard for preventing access to the moving parts, a plurality of telescopic standards upon which said guard is removably supported, the weight of said guard retaining the parts of said standards in telescoped relation, driving means for operating the moving parts of the machine, and mechanism controlled by the relative movement of the parts of said standards when said guard is lifted therefrom for disconnecting the driving means from the moving parts of the machine.

14. The combination with a machine of the class described comprising moving parts, of a guard for preventing access to the moving parts, a plurality of telescopic standards upon which said guard is removably supported, driving means for operating the moving parts of the machine, mechanism for disconnecting the driving means from the moving parts, a rock shaft controlling the operation of said mechanism, and means for operating said rock shaft controlled by the relative movements of the telescopic portions of said standards.

15. The combination with a machine of the class described comprising moving parts, of a guard for preventing access to the moving parts, a safety-board protecting the feed end of the machine, driving means for operating the moving parts of the machine, mechanism operated by the driving means for disconnecting the driving means from the moving parts, and means independently controlled by the displacement of said guard and by said safety-board for effecting the actuation of said mechanism to disconnect the driving means from the moving parts of the machine.

16. The combination with a machine of the class described comprising moving parts, of a guard for preventing access to the moving parts, a safety-board protecting the feed end of the machine, driving means for operating the moving parts of the machine, mechanism operated by the driving means for disconnecting the driving means from the moving parts, a rock shaft controlling the operation of said mechanism by the driving means, and means independently controlled by the displacement of said guard and by said safety-board for actuating said rock shaft to effect the disconnection of the driving means from the moving parts.

In testimony whereof, I have subscribed my name.

WILLIAM BARTHOLOMEW.

Witnesses:
 GEO. L. WILKINSON,
 A. L. WALTON.